United States Patent [19]
Kajii et al.

[11] Patent Number: 4,726,832
[45] Date of Patent: Feb. 23, 1988

[54] GLASS PLATE HEATING/BENDING DEVICE

[75] Inventors: Masuhide Kajii; Katsuhiko Kitaya, both of Osaka, Japan

[73] Assignee: Nippon Sheet Glass Co., Ltd., Osaka, Japan

[21] Appl. No.: 942,845

[22] Filed: Dec. 17, 1986

[51] Int. Cl.⁴ ............................................. C03B 23/02
[52] U.S. Cl. ...................................... 65/273; 65/106; 65/107; 65/288
[58] Field of Search ................ 65/104, 106, 107, 273, 65/288

[56] References Cited
U.S. PATENT DOCUMENTS 3,281,227 10/1966 Leflet, Jr. et al. .................... 65/62
4,441,907 4/1984 Nitschke ........................... 65/104 X
4,475,937 10/1984 Nitschke ........................... 65/273 X

*Primary Examiner*—Arthur Kellogg
*Attorney, Agent, or Firm*—Fitzpatrick, Cella, Harper & Scinto

[57] ABSTRACT

A local heating source is provided in a heating furnace in which a glass plate is continuously conveyed. The heating source is position-controlled by numerical data in a direction along the glass surface in accordance with the conveyance of the glass plate, so as to data-control the heating trace. As a result, the heating patterns can be easily altered in units of article types of the glass plates which are to be bent in different shapes, resulting in highly efficient production on a multi article type-small lot base.

10 Claims, 25 Drawing Figures

FIG.20
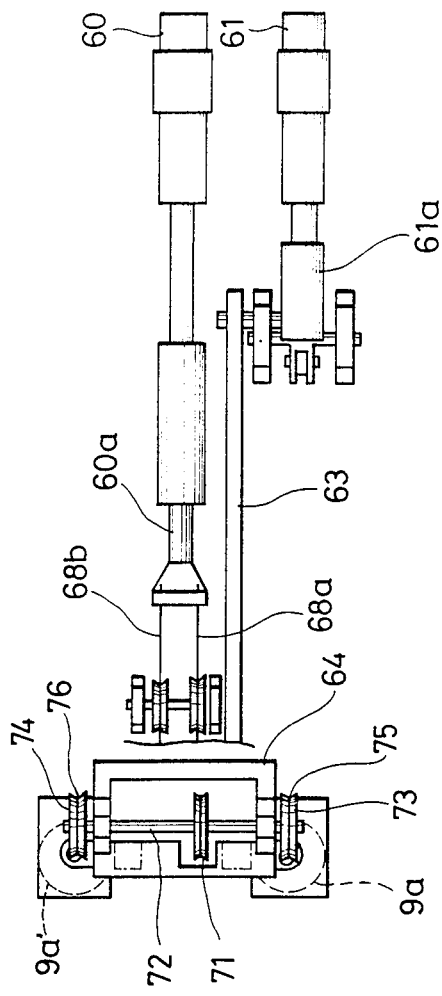
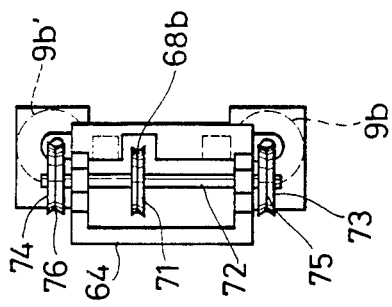

GLASS PLATE HEATING/BENDING DEVICE

BACKGROUND OF THE INVENTION

1. Field of the Invention

The present invention relates to a glass plate heating-/bending device and, more particularly, to a device suitable as a work device for an automobile window glass.

2. Description of the Prior Art

Heating/bending furnaces are used for curving or bending an automobile window glass or a glass plate for building construction. The heating/bending furnaces of this type support a glass plate on a bending mold, heat and soften the glass plate, and move the glass plate downward by its weight along the surface of the mold. When a comparatively acute bent portion having a small radius of curvature is formed, the temperature within a furnace is controlled and the glass plate is locally heated at a higher temperature along the bending line than for the remaining portion.

A fixed-type heating furnace and a continuous moving-type heating furnace are used as the heating/bending furnaces. In the former furnace, a bending mold is fixed for each glass plate or each glass plate group, and temperature control of the furnace and local heating are performed.

In the latter furnace, a row of a plurality of bending molds are conveyed within the furnace at a constant speed while heating/bending is performed.

In the fixed-type heating furnace, a wire-like electric heater or the like is used as a local heating source. It is comparatively easy to orient the heater or adjust the distance between the heater and the glass surface in accordance with the direction or the radius of curvature of the bending line to be formed on the glass surface. However, the fixed-type heating furnace is not used for a mass production system since it has a considerably low productivity.

The continuous moving-type heating furnace is suitable for mass production. However, since a local heater, such as a gas burner arranged to oppose the moving glass surface, is used for local heating, it is difficult to match the moving path of the local heater with the direction of the bending line set on the glass surface. Particularly since the moving path is formed only parallel to the glass plate convey direction within the furnace, when the direction of the bending line forms an angle with the glass plate convey direction, optimum heating cannot be performed. In other words, it is impossible to heat only a required portion, and an unnecessary portion is heated.

Since the direction or the radius of curvature of the bending line differs depending on the article type of the glass plate to be bent, it is difficult to perform production on a multi article type-small lot base. More particularly, the horizontal position and vertical height of the heating burner must be altered in units of article types, and adjustment therefor considerably degrades the productivity. Particularly when glass plates of different article types can flow in the heating/bending furnace with a random order, continuous production is almost impossible.

A furnace incorporating the features of the two bending furnaces described above can be proposed. More particularly, a wire-like heater for local heating is conveyed parallel to a bending mold which moves within the furnace. With this system, since the wire-like heater for local heating can be arranged along the bending line, optimum heating can be performed, and continuous production is possible when glass plates of the same article type are to be manufactured. However, since the local heating power is obtained using a power supply line, a current collector, and so on, the overall facility becomes complex. In addition, when glass plates are to be manufactured on the multi article type-small lot base, productivity suffers in the same manner as described above.

The present invention has been made in view of these problems, and has as its object to provide a device which enables continuous operation even on a multi article type-small lot base, which can thus provide a considerably high productivity, which can perform position and temperature control of local heating corresponding to an article type quickly and with a high precision, and which can completely work glass plates of different article types that subsequently flow in the heating/bending furnace.

SUMMARY OF THE INVENTION

A glass plate heating/bending device of the present invention heats and softens a glass plate and bends it to have a required shape, and comprises a heating furnace in which a glass plate is continuously conveyed, local heating means arranged in the furnace to oppose a glass surface, and drive means for displacing the heating means in a direction along the glass surface. Control means is provided for supplying displacement control data to the drive means in synchronism with the conveyance of the glass plate inside the furnace. The local heating means forms a heating path corresponding to the control data on the glass surface while the glass plate is conveyed.

The heating pattern can be easily altered by altering the control data, and operation can be performed with a flexibility of a considerable degree for glass plates of different article types which have different bending shapes. The device of the present invention is particularly suitable for production on a multi article type-small lot base.

BRIEF DESCRIPTION OF THE DRAWINGS

FIG. 20 is a main plan view of the drive mechanism of FIG. 18;

DETAILED DESCRIPTION OF THE PREFERRED EMBODIMENT

Figure 1:
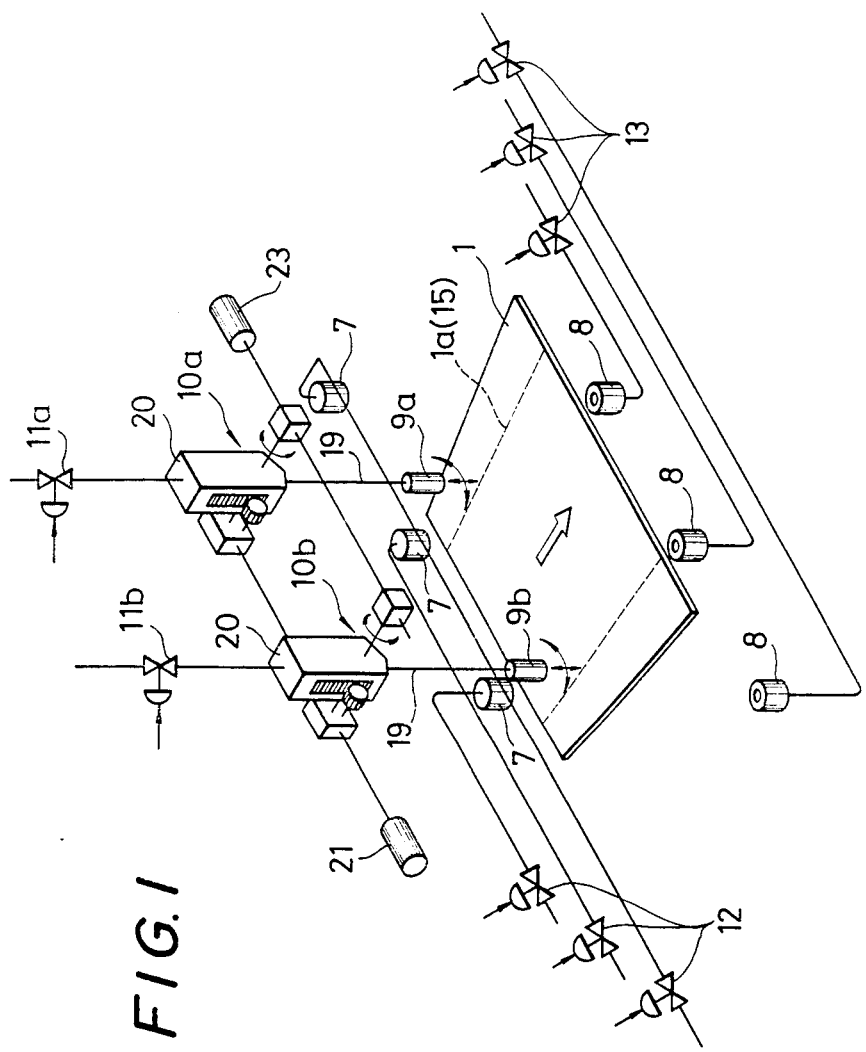
FIG. 1 schematically shows a glass plate heating-/bending device according to an embodiment of the present invention.
Figure 2:
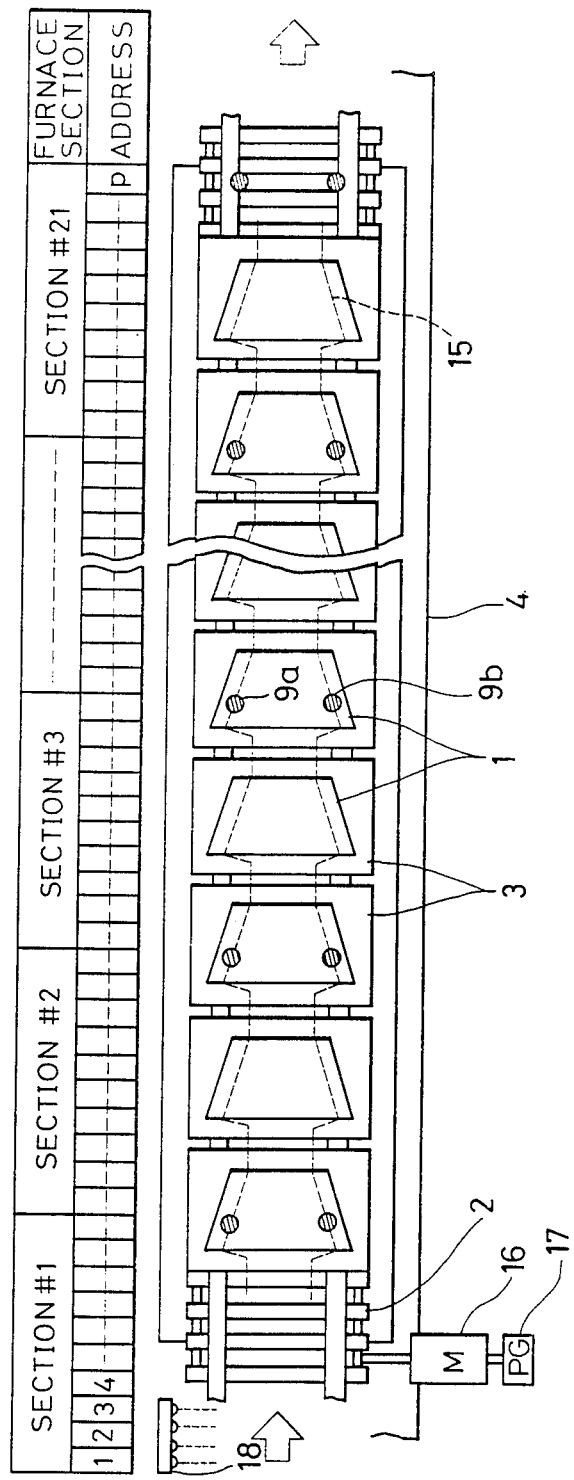
FIG. 2 is a schematic plan view of a heating/bending furnace.
Figure 3:
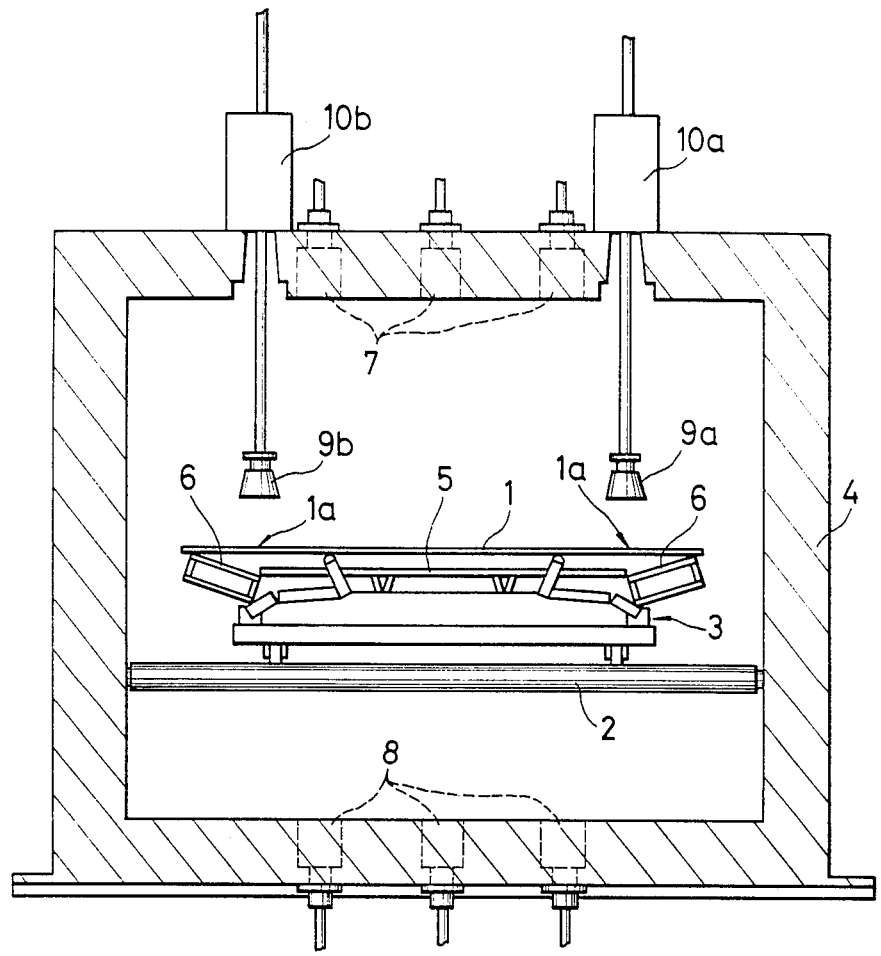
FIG. 3 is a cross-sectional view of the heating/bending furnace.

FIG. 1 is a perspective view of a main part of a heating/bending furnace according to an embodiment of the present invention, FIG. 2 is a schematic plan view of inside the furnace, and FIG. 3 is a cross-sectional view of the furnace. As shown in FIG. 3, a glass plate 1 is placed on a bending mold 3 conveyed by a roller conveyor 2 and is heated as it is conveyed within a heating furnace 4 at a constant speed. The bending mold 3 consists of a major portion 5 and two side portions 6. The two side portions 6 can move between a support position (FIG. 3) for supporting the flat glass plate and a bend position for bending a softened glass plate inward. A typical example of the bending mold 3 is disclosed in U.S. Pat. No. 3,281,227.

Fixed-type ceiling and floor gas burners 7 and 8 are used as heating sources in the furnace 4, as shown in FIGS. 1 and 3. A pair of movable gas burners 9a and 9b are arranged in the widthwise direction of the furnace as local heating sources along a glass plate bending line 1a. The movable gas burners 9a and 9b can be position-controlled by drive units 10a and 10b in a direction parallel to the glass surface (a widthwise direction of the furnace or a horizontal direction) and a direction perpendicular to the glass surface (vertical direction). Position control is performed in accordance with numerical data preset in units of article types of the glass plates 1.

The amounts of the gas to be supplied to the gas burners 9a and 9b are controlled by control valves 11a and 11b in accordance with preset numerical data in order to optimize local heating. The gas amounts supplied to the ceiling and floor gas burners 7 and 8 are controlled by control valves 12 and 13 and are set to optimize the temperature inside the furnace.

As shown in FIG. 2, the heating furnace 4 is divided into, e.g., 21 sections along a glass convey direction. Ceiling and floor gas burners 7 and 8 and a pair of movable gas burners 9a and 9b are provided in each section. Thus, heating control corresponding to glass plates of different article types can be performed in units of sections. Furthermore, address i (=1, 2, 3 . . . , p) is assigned to the furnace along its longitudinal direction with an interval of, e.g., 10 mm, and a position of a glass plate within the furnace is indicated by address data.

The addresses correspond to control points at an interval of 10 mm set on the bending line on the glass surface. Position control of the burners 9a and 9b and gas amount control of the burners 7, 8, 9a, and 9b are performed at each control point. In other words, assuming that the addresses are plotted along an x-axis, y-axis (widthwise direction) control data, z-axis (vertical direction) control data, and control data of a gas amount $\beta$ of the respective points on the x-axis are read out from a memory and heating control is performed according to the readout data. As a result, as indicated by the broken lines in FIG. 2, moving paths 15 of the burners 9a and 9b on the glass surface are unicursal.

In practice, the interval of the addresses corresponds to the interval of output pulses PG of a pulse generator (PG) 17 mounted on the shaft of a drive motor 16 of the roller conveyor 2. The pulse PG is generated every time the glass plate 1 on the bending mold 3 is conveyed for 10 mm. The position of the glass plate 1 within the furnace is tracked based on the address table formed in the memory of a computer every time a pulse PG is generated. The address of the control point opposing the movable burners 9a and 9b can be obtained by referring to the address table.

An article type code is written in the address table in order to specify the article type of the glass plate 1 opposing the movable burners 9a and 9b. The article type code is attached on the side end of the bending mold 3, read by a code reader 18 at an input port end of the heating furnace 4, and is written in the address table memory.

Figure 4:
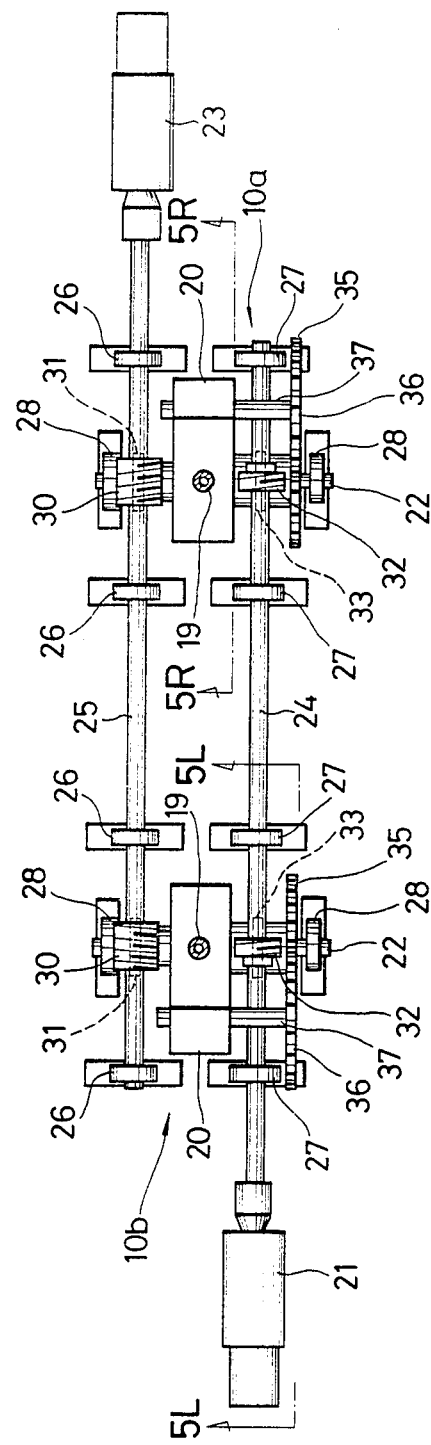
FIG. 4 is a plan view of a drive unit for movable gas burners.
Figure 5:
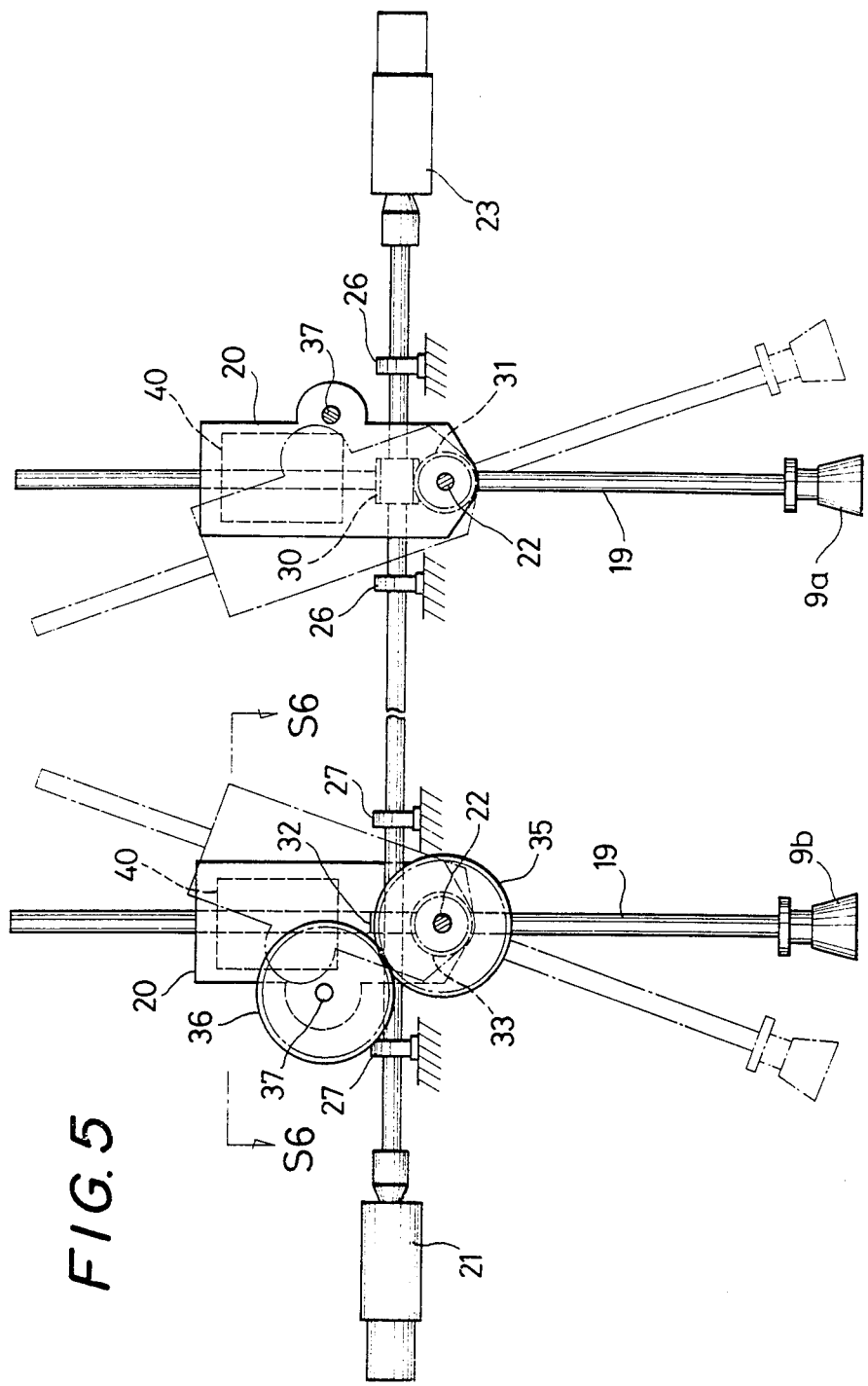
FIG. 5 is a front view of the drive unit.
Figure 6:
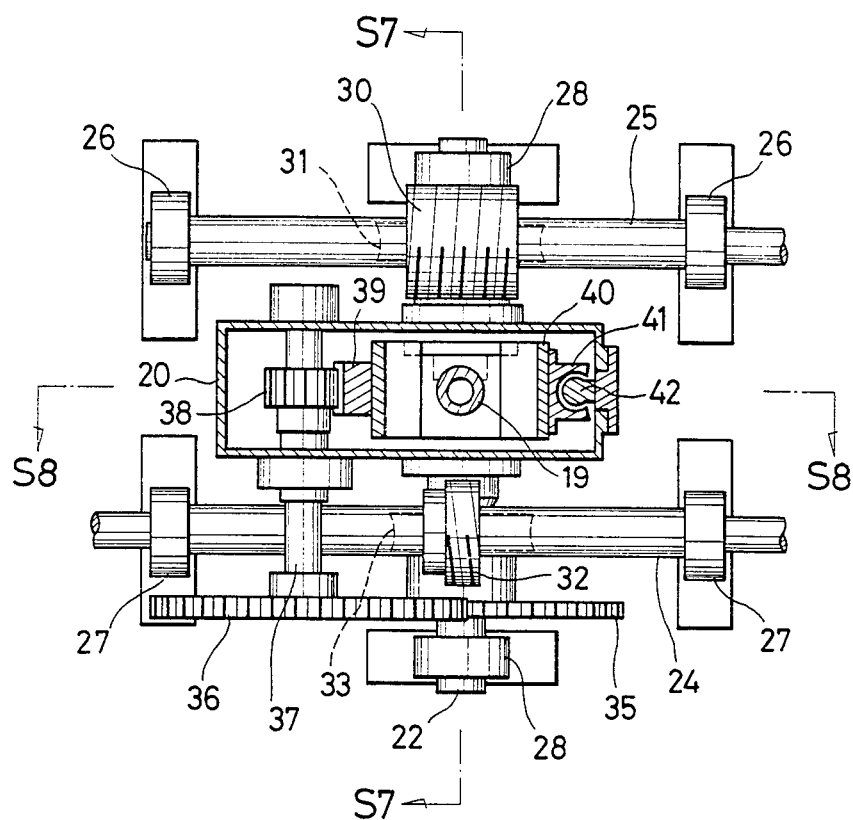
FIG. 6 is a horizontal sectional view of the drive unit.
Figure 7:
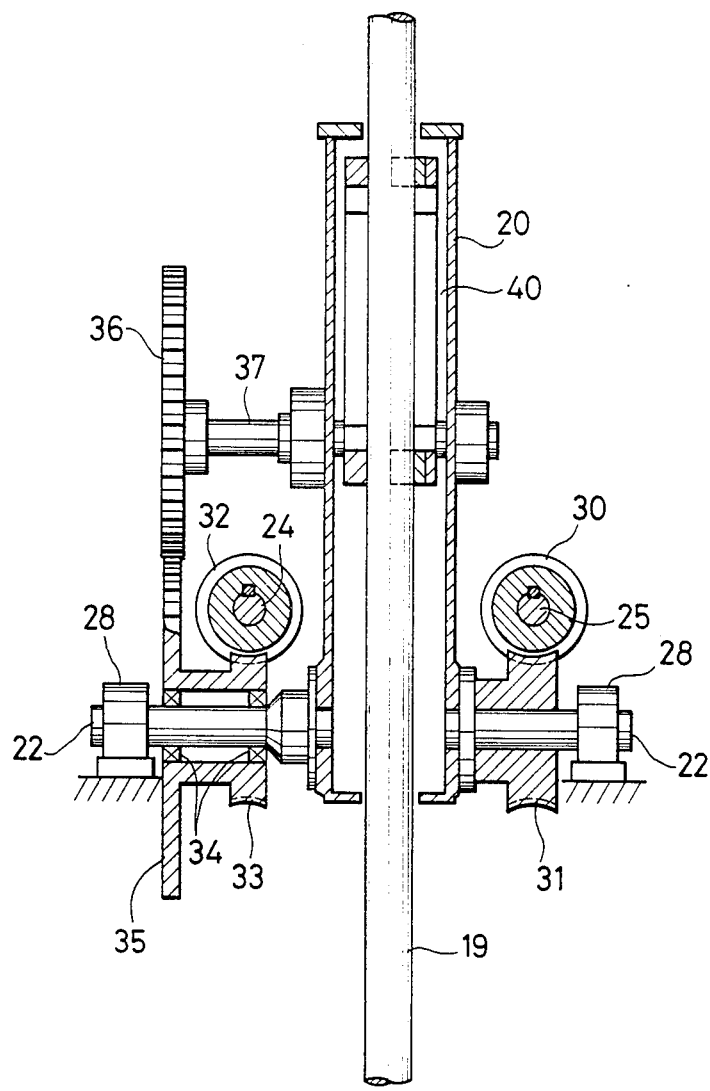
FIG. 7 is a longitudinal sectional view taken along the line S7 of FIG. 6.
Figure 8:
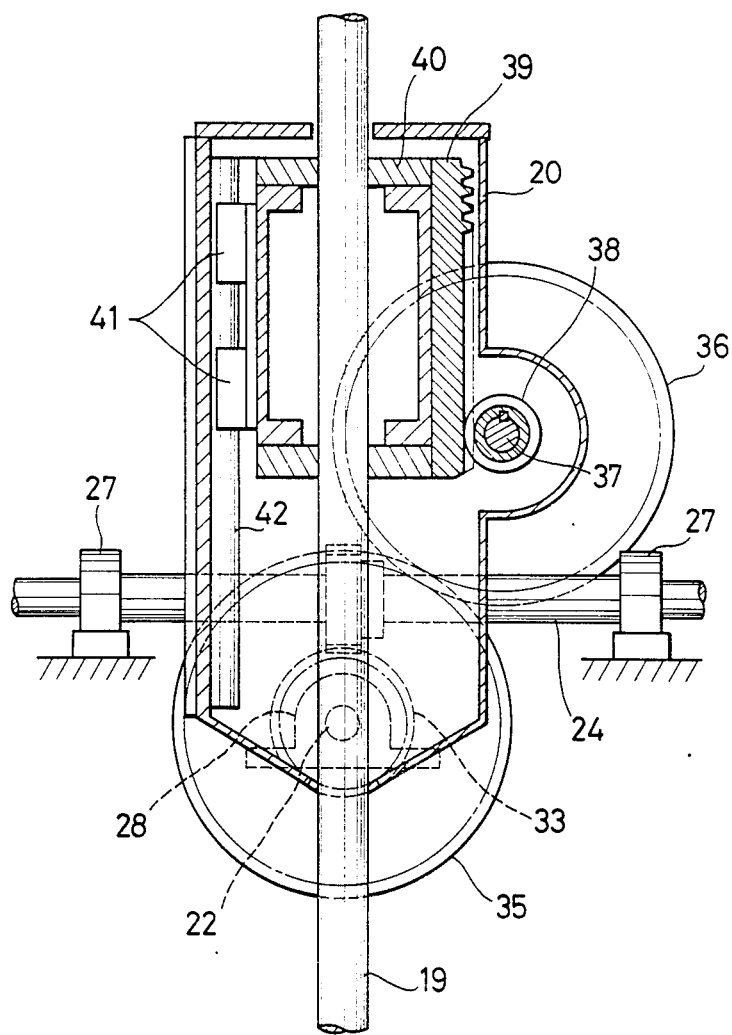
FIG. 8 is a longitudinal sectional view taken along the line S8 of FIG. 6.

FIGS. 4 to 8 show the drive units 10a and 10b of the movable gas burners 9a and 9b in detail. FIG. 4 is a plan view, the right half of FIG. 5 is a sectional view taken along the line 5R of FIG. 4 and the left half thereof is a sectional view taken along the line 5L of FIG. 4, FIG. 6 is a cross-sectional view of the right-hand side drive unit 10b which is taken along the line S6 of FIG. 5, and FIGS. 7 and 8 are longitudinal sectional views taken along the lines S7 and S8, respectively, of FIG. 6.

Conduits 19 connected to the burners 9a and 9b, respectively, are slidably held in housings 20 of the drive units 10a and 10b. When the conduits 19 are vertically moved by a z-axis motor 21, the burners 9a and 9b are vertically position-controlled (in the z-axis direction). Each housing 20 is pivotally supported by a support shaft 22 horizontally held by a bearing 28. When the housings 20 are pivoted by a y-axis motor 23 in the manner as shown in FIG. 5, the burners 9a and 9b are position-controlled in the horizontal direction (y-axis direction). The z- and y-axes motors 21 and 23 are commonly used by the units 10a and 10b. Therefore, The units 10a and 10b are coupled to the output shafts of the motors 21 and 23 through coupling shafts 24 and 25 supported by bearings 26 and 27.

In the units 10a and 10b, a pair of worms 30 are mounted on the horizontal control coupling shaft 25, as shown in FIGS. 6 and 7. A pair of worm wheels 31 engaged with the worms 30 are fixed on the support shafts 22. The support shafts 22 are fixed on the lower end of the housings 20. Therefore, the housings 20 are rotated by the rotation of the motor 23. Since the tooth angles of the worms 30 of the drive units 10 and 10b are opposite to each other, as shown in FIG. 4, when the y-axis motor 23 is rotated, the burners 9a and 9b are pivoted outward or inward simultaneously, i.e., symmetrically, as shown in FIG. 5.

In the units 10a and 10b, a pair of worms 32 are mounted on the height control coupling shaft 24, as shown in FIGS. 6, 7, and 8. A pair of worm wheels 33 engaged with the worms 32 are rotatably supported by the support shafts 22 through bearings 34. Gears 35 are integrally mounted on the worm wheels 33. Gears 36 engaged with the gears 35 are fixed on vertical drive shafts 37 pivotally supported on the side portions of the housings 20. Pinions 38 are mounted on the vertical drive shafts 37. Racks 39 engaged with the pinions 38 are mounted on one sides of slidable members 40 for holding the conduits 19.

The slidable members 40 firmly hold the conduits 19 at upper and lower ends thereof. Slidable bearing units 41 are mounted on the other sides of the slide members 40. The slidable members 40 are slidably held by the guide shafts 42 which are mounted inside the housings 20 through the slide bearing units 41. Thus, when the z-axis motor 21 is rotated, the slidable members 40 are vertically moved through the worms 32, the worm wheels 33, the gears 35 and 36, the pinions 38, and the racks 39, in order to perform position control of the burners 9a and 9b in the vertical direction (the longitudinal direction of the conduits 19). Since the engaging relationship of the transmission system from the worms 32 to racks 39 does not change by the rotation of the housings 20, the rotation and height of the burners 9a and 9b can be controlled independently from each other without interfering with each other.

Figure 9:
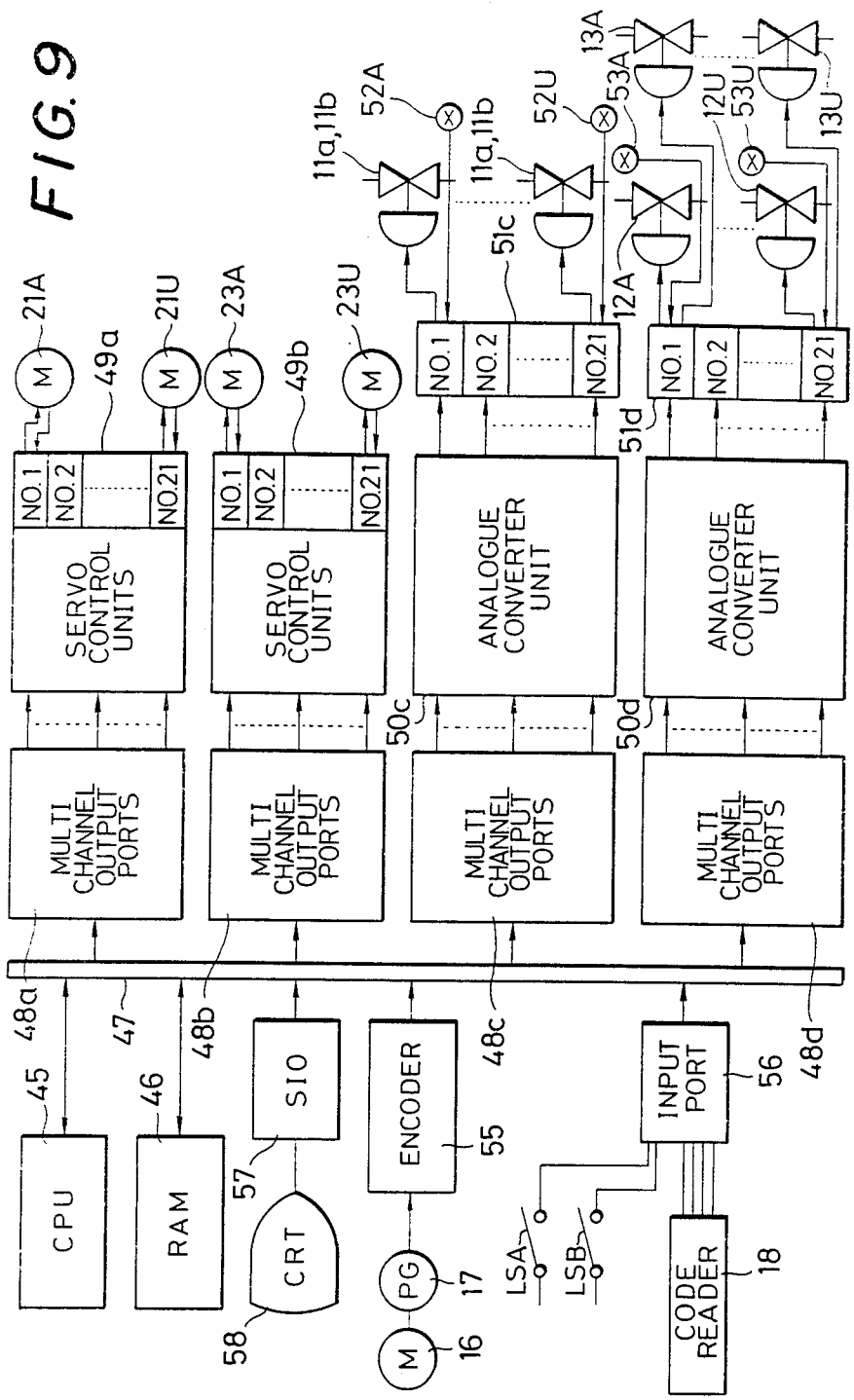
FIG. 9 is a block diagram of a control system.

FIG. 9 is a block diagram of a control system of the glass plate heating/bending furnace shown in FIGS. 1 to 8. The control system comprises a computer having a CPU 45 and a memory 46 (RAM). The control data for each control point is stored in the memory 46. The control data read out by the CPU 45 is supplied to multichannel output ports 48a to 48d through a bus 47. Outputs from the output ports 48a and 48b are supplied to 21-channel servo control units 49a and 49b corresponding to the sections of the furnace. Control outputs from the respective channels servo-control z-axis height control motors 21A to 21U and y-axis angle control motors 23A to 23U for the movable burners 9a and 9b. Thus, the movable burners 9a and 9b are position-controlled.

An output from the output port 48c is supplied to a direct digital loop control unit (DDLC) 51c through an analog converter unit 50c as a temperature control output. An output from the DDLC 51c controls the gas amount control valves 11a and 11b of each section. Temperature sensors 52A to 52U are arranged in the vicinity of the movable gas burners 9a and 9b of the respective sections. The DDLC 51c performs calorie control by loop control, such as PID (proportional plus integral plus derivative), in accordance with the temperature detection output.

Similarly, an output from the output port 48d is supplied to a direct digital loop control unit 51d through an analog converter unit 50d. An output from the unit 51d controls the openings of the control valves 12 and 13 of the ceiling and floor gas burners of each section. Temperature sensors 53A to 53U are provided for the respective sections. Detection outputs from the sensors 53A to 53U are fed back to the DDLC 51d to perform loop control such as PID control.

The control system of the movable burners 9a and 9b and ceiling and floor burners 7 and 8 has 21 channels to correspond to the sections in the furnace. Therefore, the burners can be controlled in units of sections, and glass plates of different article types can thus be sequentially supplied into the furnace.

Figure 10:
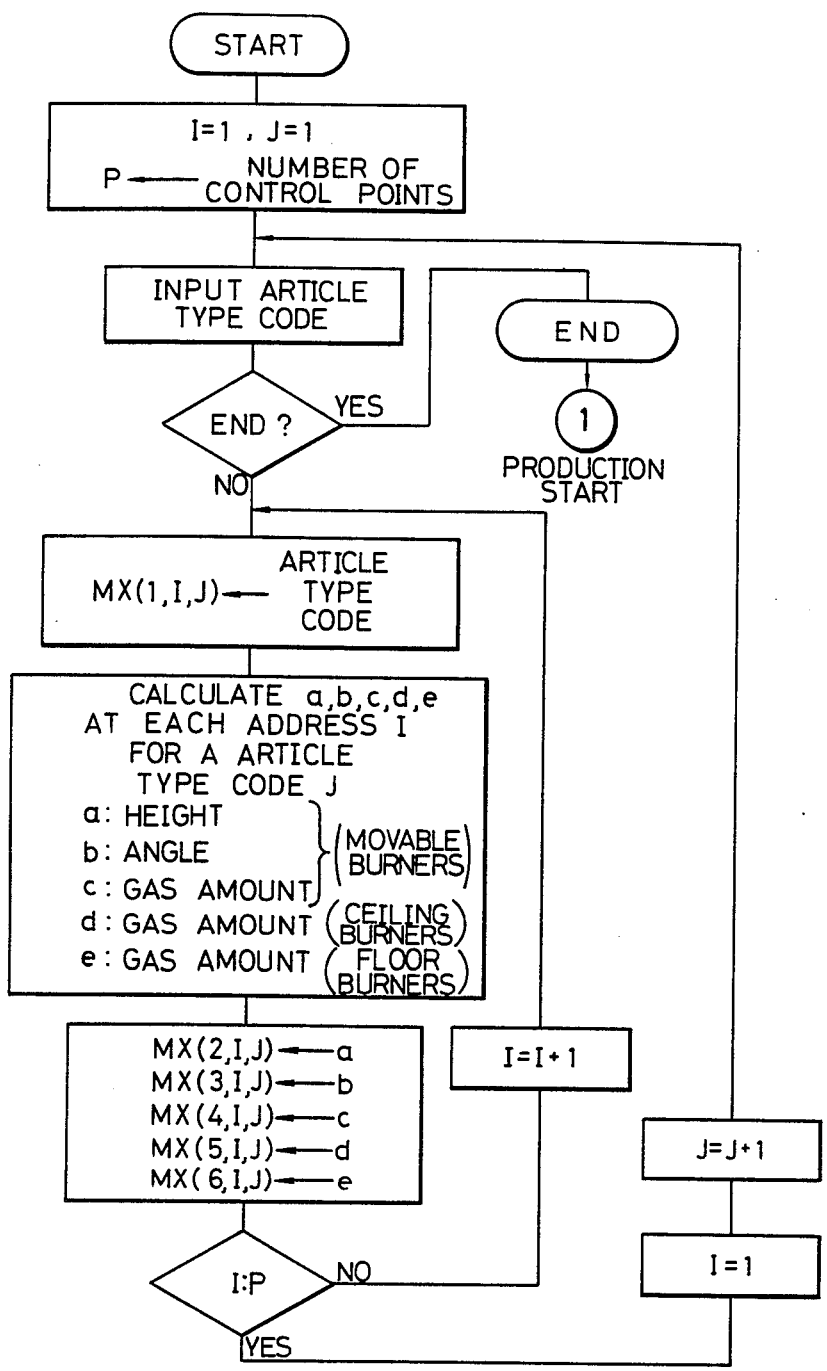
FIG. 10 is a flow chart showing an input processing sequence of control data.
Figure 11:
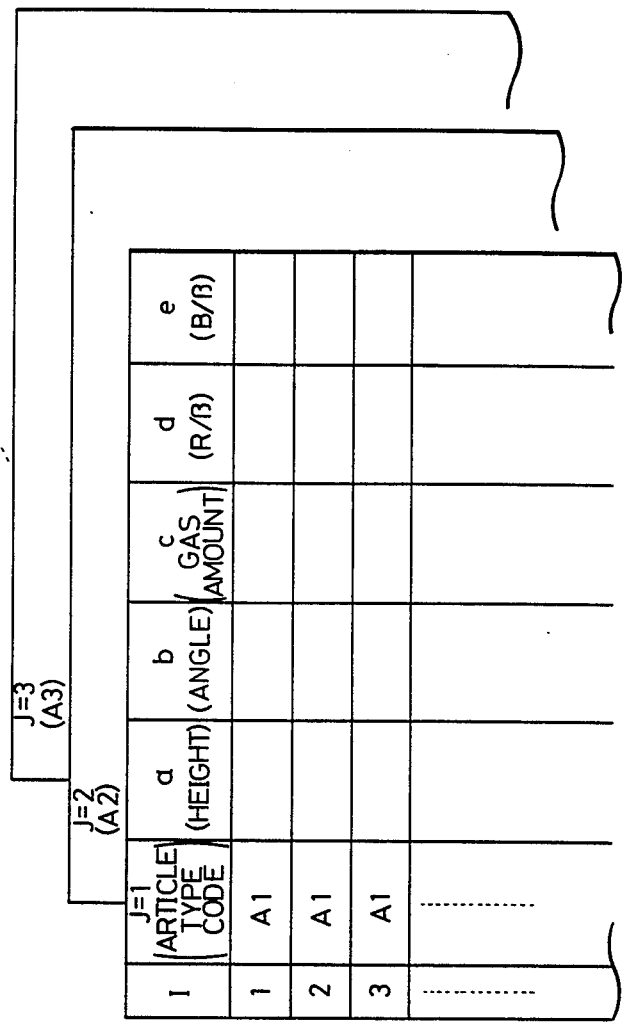
FIG. 11 is a table showing control data.

FIG. 10 is a flow chart showing a sequence for inputting control data in the memory 46 shown in FIG. 9, and FIG. 11 shows a data table of the memory 46. First, index "I" corresponding to inter-furnace address i in the heating furnace 4 and index "J" corresponding to the glass plate article type codes A1, A2, ... are set. I = 1 and J = 1 are set as initial values, and p is input as the number of inter-furnace control points (the number of addresses).

One article type code A1 is input and is written in a cell MX(1,I,J) of the data table. Then, the height a, angle b, and gas amount c of the movable burners 9a and 9b and the gas amounts d and e of the ceiling and floor burners 7 and 8 for code A1 are calculated, and are written in cells MX(2,I,J), MX(3,I,J), MX(4,I,J), MX(5,I,J), and MX(6,I,J), respectively. This operation is repeated for I = 1 to p. Then, control amounts a to e for every inter-furnace control points for the particle type A1 are set, as shown in FIG. 11.

Since the inter-furnace addresses 1 to p are divided into 21 sections, p/21 control points are assigned to each section. Namely, one pair of movable burners is associated to p/21 control points and its position and calorie are controlled. When glass plates of the same article type is to be treated, the same position and calorie controls can be performed for the control points corresponding to different sections. Even in this case, however, the height and gas amount controls of the movable burners may differ for every different sections inside the furnace, so that a temperature gradient can be formed in the longitudinal direction of the furnace. This is useful to prevent abrupt heating or colling.

Subsequently, J is incremented by one and control data a to e are set for control points of I = 1 to p for another article type A2. When this operation is repeated, a data table as shown in FIG. 11 can be formed for every article type.

Figure 12A:
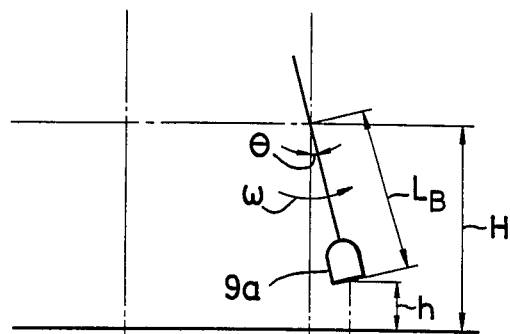
FIGS. 12(A) and 12(B) are schematic diagrams, respectively, of the movable burners and a glass plate for obtaining equations for calculating the control data.
Figure 12B:
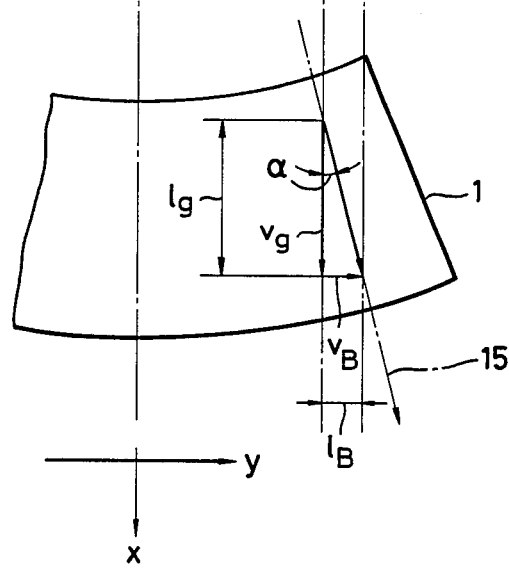

The height control data a and the angle control data b of the movable burners 9a and 9b can be calculated as shown in FIGS. 12(A) and 12(B). As shown in the cross-sectional view of the furnace of FIG. 12(A), assume that the distance between the rotational center of the movable burner 9a (9b) from the center of the furnace is $l_{BO}$, the height of the rotational center is H, and the length of the burner measured from the rotational center is $L_B$. Assume that the glass moving velocity is Vg, as shown in the plan view of the glass plate 1 of FIG. 12(B). Assume that the angle of the burner moving path 15 defined by each glass article type to the x-axis (glass convey direction) is $\alpha$, and the height of the burner is h.

The rotational angle $\theta$ or rotational angular speed $\omega$ and height h of the burner are numerically controlled such that the sum of the velocity vector Vg along the x-axis and the burner moving velocity vector $V_B$ along the y-axis (widthwise direction) coincides with the moving path 15 on the glass surface. Then, $$l_{BO} + l_B = l_{BO} + L_B \cdot \sin\theta \quad (1)$$

$$= l_{BO} + L_B \cdot \sin\omega t$$

Also, $$l_B = l_g \cdot \tan\alpha = V_g t \cdot \tan\alpha \quad (2)$$

where lg is a distance the glass plate shift within a unit time t. The height h of the burner is:

$$h = H - L_B \cos\theta = H - L_B \cos\omega t \quad (3)$$

Therefore, $L_B$ (the height of the burner) and $\theta$ can be calculated from equations (1) to (3). When the distance $l_g$ is identical with the interval of the inter-furnace control points (addresses) and the corresponding angle $\theta$ and length $L_B$ per unit time t are calculated, the height and angle data a and b can be defined for every control point.

Since the angle $\alpha$ of the burner moving path 15 does not necessarily coincide with the angle of the side edge of the glass plate to the x-axis, $\alpha$ is defined in accordance with a heating pattern required corresponding to the angle of the bending line.

Figure 13:
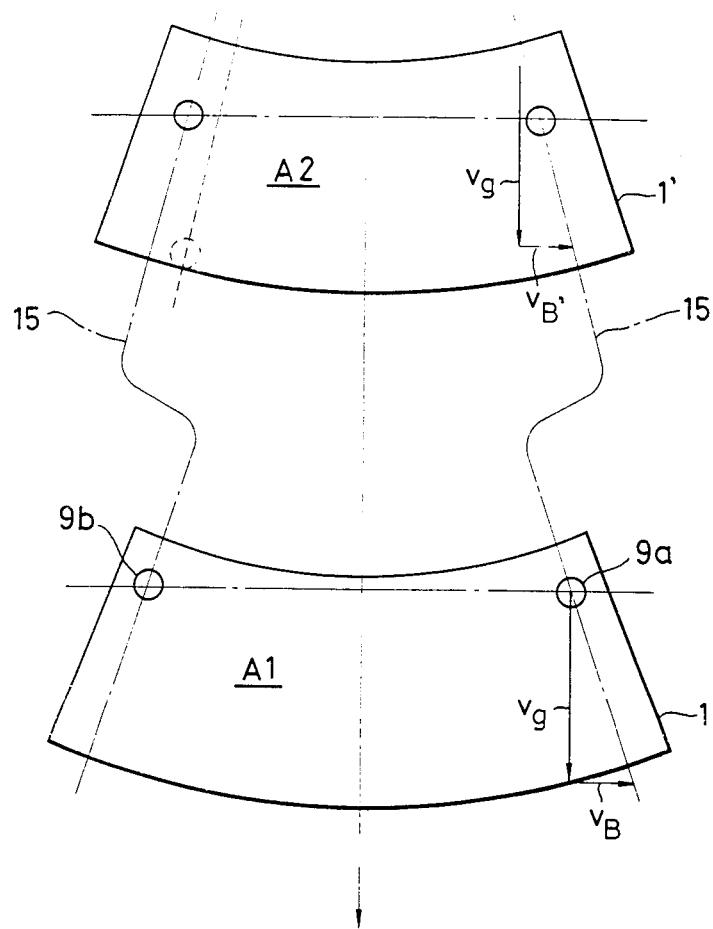
FIG. 13 is a schematic diagram showing moving paths of the movable burners.

As shown by the burner traces of FIG. 13, the moving paths 15 (burner speed $V_B$) for each section is altered in accordance with glass article type (A1, A2, ...) belonging to the section. Therefore, every time the burners 9a, 9b reache particular control points provided at a conveying interval of the bending molds 3, they are shifted to next paths 15 for a following article type. The pair of right- and left-hand side movable burners 9a and 9b are position-controlled such that their moving paths are symmetrical with respect to their central line.

The gas amounts c, d, and e are set for every control point in accordance with the glass article type (thickness and size). It is preferable to change the gas amount in units of control points or sections as the glass plate is conveyed and thus to impart temperature gradient along the longitudinal direction of the furnace. The curve of the temperature gradient is determined in units of glass article types. Alternatively, the gas amount can be set to be constant for each section.

The control data a to e set in this manner are stored in the memory 46. The bent glass plate is actually checked. If any unpreferable point is found in the obtained glass plate, the respective control data in the memory 46 are corrected, and optimum heating is performed.

Figure 14:
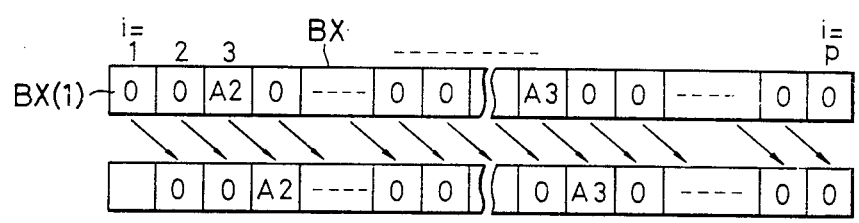
FIG. 14 shows the format of a tracking buffer memory corresponding to the addresses of the furnace.

Readout of the control data from the memory 46 will be described. The control data is read out from the memory 46 while the glass plate is tracked by means of the output (pulse PG) from the pulse generator 17 mounted on the motor 16 for driving the roller conveyor 2 in the furnace, as described above. The memory 46 has, as a tracking buffer, an address table BX (1) to BX (P) having addresses corresponding to the inter-furnace addresses i=1 to p as shown in FIG. 14.

Figure 15:
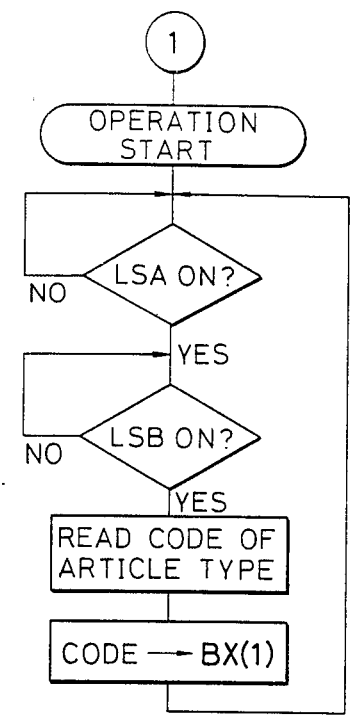
FIG. 15 is a flow chart showing an input sequence of the tracking buffer memory for tracking the glass plate within the heating furnace.

As shown by the flow chart of FIG. 15, when the operation of the heating furnace 4 is started, an article type code reader 18, provided at the input port end of the heating furnace 4, reads the article type codes A1, A2, ... of the bending mold 3 at timings determined by limit switches LSA and LSB. The limit switch LSA is turned on during operation of the roller conveyor 2. The limit switch LSB is turned on when the leading end of the bending mold 3 has reached the input port end of the furnace. The article type code data is transferred to the CPU 45 through an input port 56, identified or checked, and written at first address BX(1) of the tracking buffer shown in FIG. 14.

Figure 16:
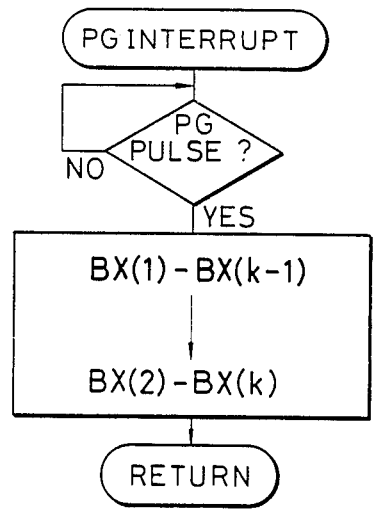
FIG. 16 is a flow chart of a PG interrupt routine for shifting the tracking pulse in response to a pulse PG.

As shown by the flow chart of FIG. 16, a PG interrupt routine is started every time a pulse PG is generated by the pulse generator 17, and the content of the tracking buffer BX is shifted to the right by one address. More particularly, every time the glass plate 1 placed on the bending mold 3 travels for 10 mm in the furnace, the article type codes A1, A2, ... in the tracking buffer BX are advanced by one address. As a result, tracking can be performed as to the inter-farnes address and type of a plate glass 1 in the furnace. In other words, it is possible by referring to the tracking buffer BX to determine control point on the glass surface to which the movable burners 9a and 9b oppose.

Figure 17:
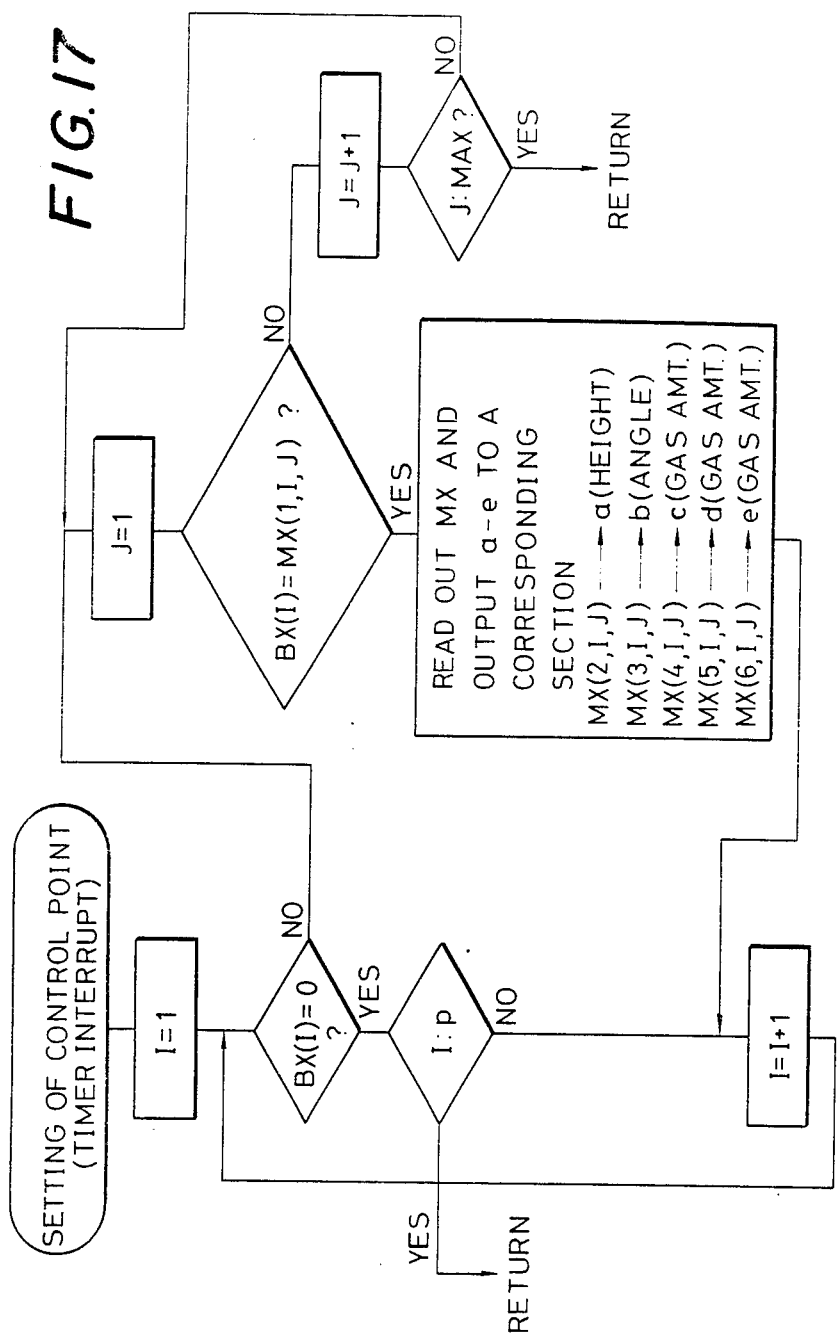
FIG. 17 is a flow chart of a readout sequence of the control data.
Figure 18:
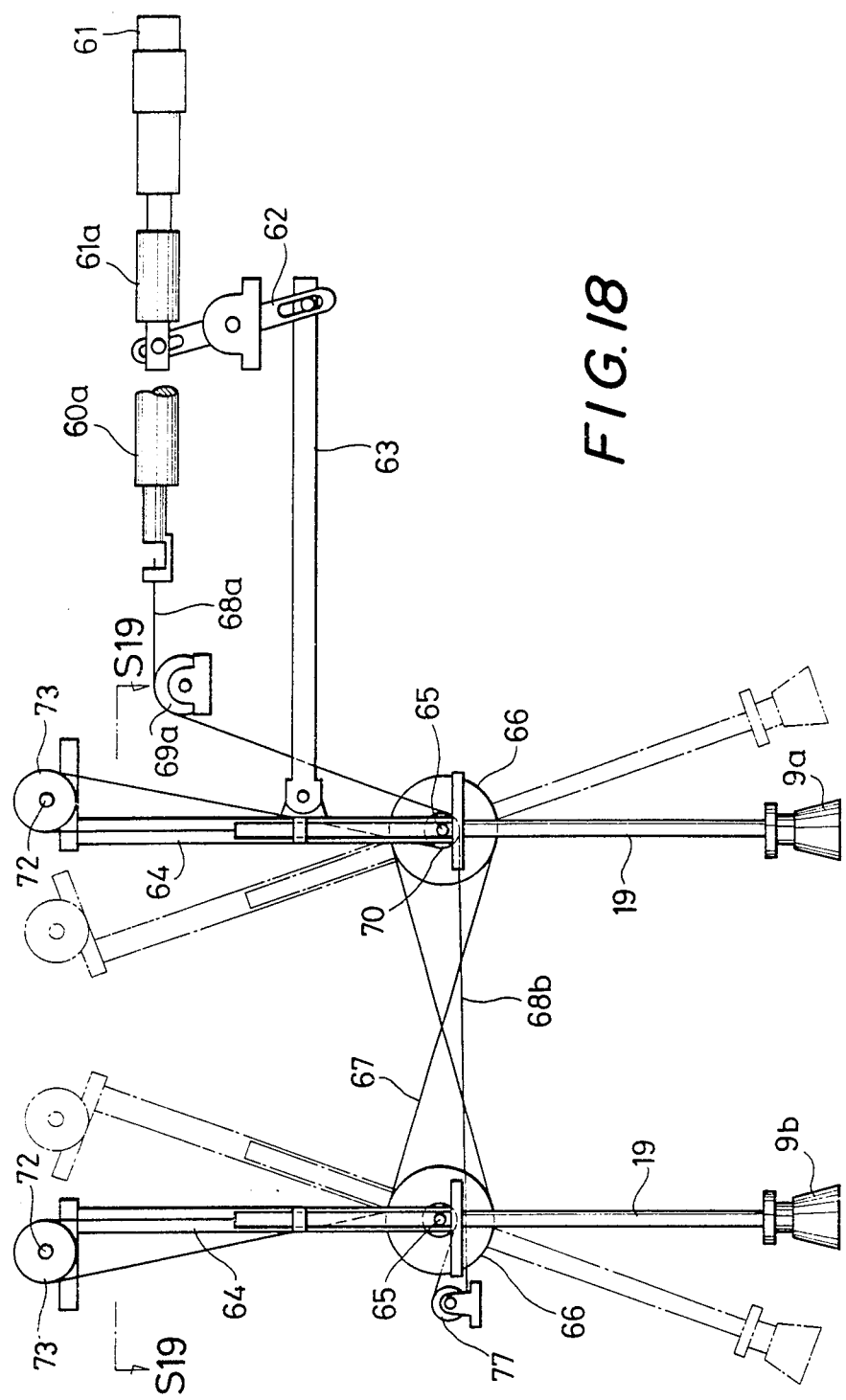
FIG. 18 is a main part front view of a modification of the drive mechanism for the movable gas burners.
Figure 19:
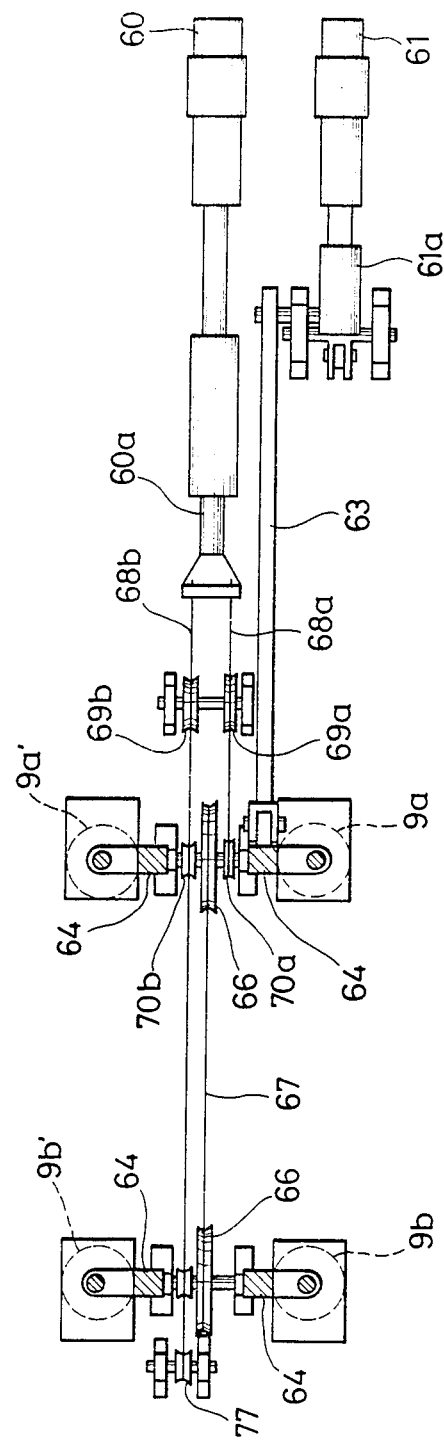
FIG. 19 is a main horizontal section view of the drive mechanism of FIG. 18.

The processing of control point setting shown in FIG. 17 is performed by a timer interrupt routine of a constant time interval at a cycle sufficiently shorter than the shift interval of the tracking buffer BX by the pulse PG. In this timer interrupt routine, an address at which an article code is stored is searched while the readout address I (address index) of the tracking buffer BX (I) shown in FIG. 11 is continuously advanced from 1 to p. For example, when article type code 'A2' is stored at address I=3, as shown in FIG. 14, it is found that an address i=3 is assigned to a control point, which is to be set for the movable burners 9a and 9b belonging to the first section.

Then, the flow is branched to an article type code reference loop. Article type code "A2" read out from third address BX (3) of the tracking buffer BX is compared with article type code MX(1,I,J) at address I=3 of the data table MX shown in FIG. 11 while the article type index J is incremented in unitary increments from 1 to MAX (maximum value). In this example, since a coincidence is detected when J=2, control data a to e indicated by index (I,J)=(3,2) are read out from corresponding addresses MX(2,I,J), MX(3,I,J), ..., and MX(6,I,J) of the data table MX. The respective readout data are supplied to the control elements of the movable burners 9a and 9b and the ceiling and floor burners 7 and 8 of the first section (the first channel).

When the control data setting for the first channel is completed, the flow enters the address retrieval loop again. A next article type code on the tracking buffer MX is retrieved while the address index I is further incremented in unitary increments. The above processing is repeated to retrieve all addresses i=1 to p of the furnace, to collate article type, and to supply the control data to the corresponding channel.

Referring to FIG. 9, a CRT 58 connected to a serial I/O port 57 is used as a monitor or the like to monitor the control data when the computer is initialized, or to monitor the glass plate convey state inside the furnace when the heating/bending furnace is operated.

FIGS. 18 to 24 show several modifications of the drive mechanism for the movable gas burners 9a and 9b. In a modification shown in the main part front view of FIG. 18, a main horizontal sectional view (taken along the section indication line S19 of FIG. 18) of FIG. 19, and a main plan view of FIG. 20, air cylinders 60 and 61 are used as height and angle control elements for the movable burners 9a and 9b.

An output shaft 61a of the angle control air cylinder 61 is coupled to an intermediate portion of a vertical guide frame 64 through a lever 62 and a horizontal rod 63. The guide frame 64 slidably holds a conduit 19, which is connected to a right movable burner 9a while it is rotatably supported by a support shaft 65. Therefore, when the output shaft 61a of the air cylinder 61 is extended or retracted, the guide frame 64, the conduit 19 guided thereby, and the burner 9a are angularly displaced within a plane along a widthwise direction of the furnace.

A pulley 66 is fixed to the support shaft 65 which rotates together with the guide frame 64. The pulley 66 is coupled to a left pulley 66 through a crossing wire 67. The left pulley 66 is provided in a left-hand side unit comprising a guide frame 64, a support shaft 65, a conduit 19, and a burner 9b. The left-hand side unit is symmetrical with the right-hand side unit. Therefore, when the right-hand side unit is pivoted, the left-hand side unit is pivoted. These units are pivoted in opposing directions, i.e., clockwise and counterclockwise with respect to the center of the furnace, or vice versa. In this embodiment, two pairs of burners 9a and 9a' and 9b and 9b' constitute a movable burner unit for one section.

A pair of wires 68a and 68b are connected to an output shaft 60a of the height control air cylinder 60 to be parallel to each other. The wire 68a is wound around a pulley 70a rotatably supported by the support shaft 65 of the right-hand side unit through the pulley 69a, and is wound around a pulley 71 mounted on the upper end of the guide frame 64. Thus, the pulley 71 is rotated upon extention/retraction of the air cylinder 60.

Pulleys 73 and 74 are fixed on the two ends of a support shaft 72 of the pulley 71. Wires 75 and 76 are wound around the pulleys 73 and 74, respectively, in a direction opposing to that of the wire 68a, and are coupled to the distal ends of a pair of conduits 19. Thus, the pair of conduits 19 held by the guide frame 64 and the burners 9a and 9a' are vertically moved by the rotation of the support shaft 72.

The wire 68b coupled to the output shaft 60a of the air cylinder 60 is wound around a pulley 77 provided in the vicinity of the left-hand side unit through the pulley 69b and a pulley 70b mounted on the support shaft 65, and is coupled to the vertical drive mechanism of the left-hand side unit. The vertical drive mechanism of the left-hand side unit has the same configuration as that of the right-hand side unit.

Figure 21:
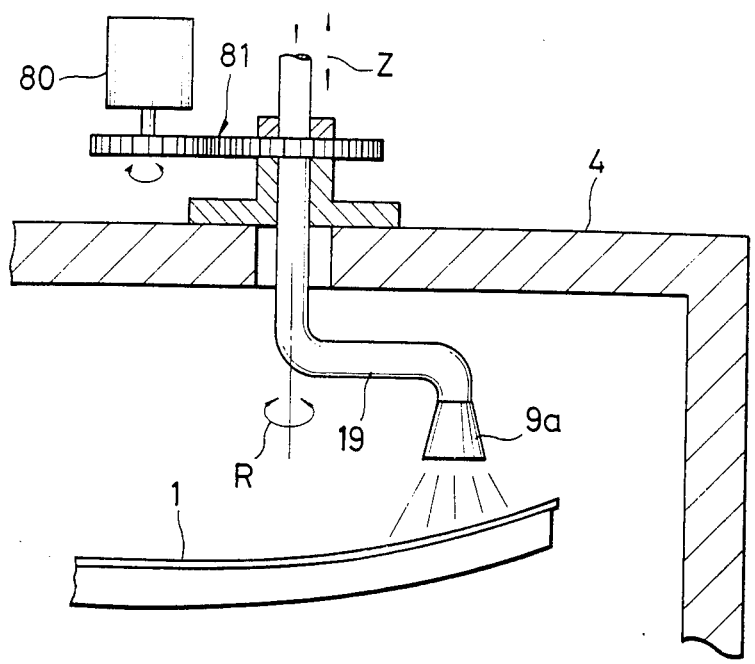
FIG. 21 is a fragmentary cross-sectional view of a main part of a furnace and showing a modification of the invention.
Figure 22:
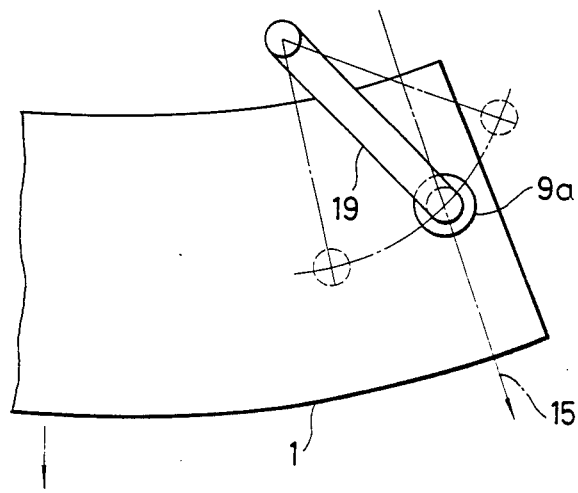
FIG. 22 is a diagrammatic plan view of a movable burner shown in FIG. 21.

FIGS. 21 and 22 show another modification. As shown in a cross-sectional view of a main part of the furnace in FIG. 21, a conduit 19 of a movable burner 9a is bent in a crank shape and extends into the furnace from the ceiling of a heating furnace 4. The conduit 19 is pivotal along the direction of arrow R in a horizontal plane, as shown by the partial plan view of FIG. 22. The rotational drive force is transmitted from a motor 80 through a gear unit 82. The conduit 19 is supported to be vertically movable, and is vertically moved by a linear drive unit having a pinion-rack mechanism and a power cylinder in the direction of arrow Z. In this manner, the height of the burner 9a with respect to the glass surface is adjusted.

Figure 23:
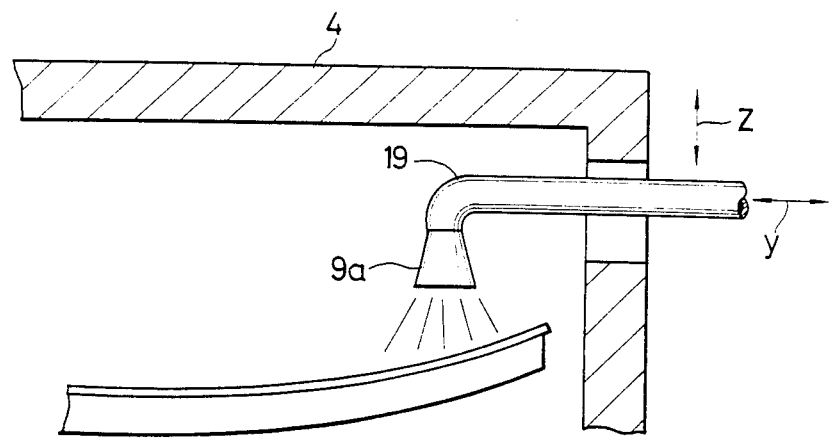
FIG. 23 is a fragmentary cross-sectional view of a main part of a furnace and showing a further modification of the invention.
Figure 24:
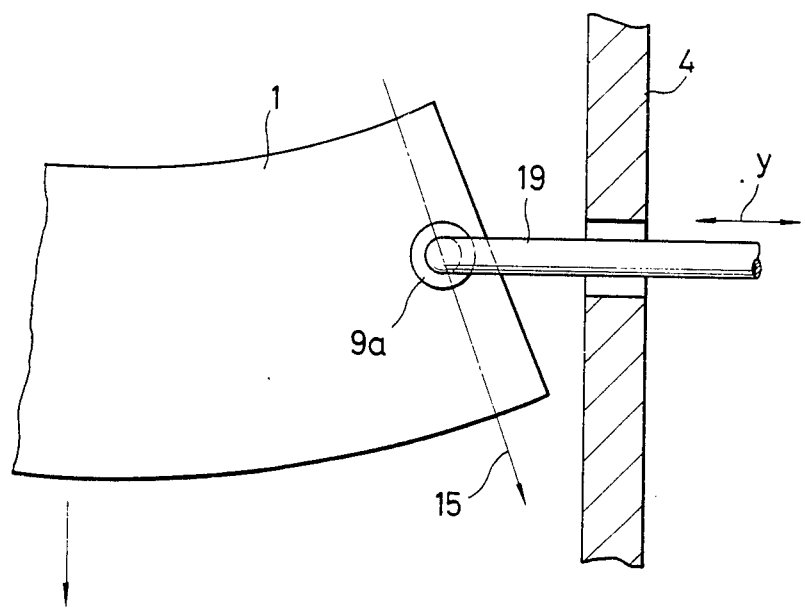
FIG. 24 is a plan view of the further modification shown in FIG. 23.

FIGS. 23 and 24 show still another modification. As shown by the main part sectional view of FIG. 23 and the main part plan view of FIG. 24, an L-shaped burner conduit 19 extends from the side wall of a furnace 4 into the interior and can be displaced in the directions of arrows y and z. As a result, the vertical position or height of the burner along or with respect to the glass surface can be adjusted.

As described above, according to the present invention, a heating pattern can be altered only by altering control data for a glass plate of a different article type which is to be bent in a different shape. As a result, the heating/bending furnace can be continuously operated even for a production on a multi particle type-small lot base, thus considerably improving the productivity.

What is claimed is:

1. A glass plate heating/bending device for heating and softening a glass plate and bending the same to have a required shape, comprising:
    a heating furnace in which a glass plate is continuously conveyed, local heating means arranged in said furnace to oppose a glass surface, drive means constructed and arranged for displacing said heating means to move relative to the glass surface as the glass plate is conveyed through the furnace, and control means for supplying displacement control data to said drive means in synchronism with the conveyance of the glass plate inside said furnace, wherein
    said local heating means forms a heating path corresponding to the control data on the glass surface while the glass plate is conveyed.

2. A device according to claim 1, wherein said drive means further comprises means for vertically displacing said heating means with respect to the glass surface, and said control means supplies displacement control data about a direction along the glass surface and a vertical direction to said drive means in synchronism with the conveyance of the glass plate.

3. A device according to claim 1, wherein said local heating means comprises calorie control means, and said control means supplies calorie control data in synchronism with the conveyance of the glass plate.

4. A device according to one of claims 1 to 3, wherein said local heating means comprises a gas burner.

5. A device according to any one of claims 1 to 3, wherein said heating furnace is assigned with addresses along a convey direction of the glass plate and comprises means for tracking a position of the glass plate, which is conveyed in said furnace, in accordance with the address, means for supplying address data corresponding to the position of the glass plate to said control means as coordinate data on the glass surface opposing said heating means, so as to output corresponding control data from said control means.

6. A device according to claim 5, wherein said tracking means comprises memory means having an address region corresponding to the address inside said furnace, means for inputting data representing a glass plate to said memory means every time the glass plate is conveyed into said furnace, and means for shifting the glass data in an address increasing direction as the glass plate is conveyed in said furnace.

7. A device according to claim 6, wherein the data representing the glass plate is an article type code indicating an article type of a glass plate, and said data input means comprises a code reader.

8. A device according to claim 7, wherein said shift means comprises means for generating a pulse at every address in said furnace, so that the content of said memory is shifted in an address increasing direction by the pulse.

9. A device according to claim 1, wherein said heating furnace is divided into a plurality of sections in a longitudinal direction thereof, said movable heating means is provided in each of said sections, and said control means has output channels corresponding in number to said sections.

10. A device according to claim 9, wherein a plurality of sets of control data is prepared corresponding to the number of article types of the glass plates, and said control means supplies control data corresponding to glass plates of different article types for each channel.

* * * * *

UNITED STATES PATENT AND TRADEMARK OFFICE
CERTIFICATE OF CORRECTION

PATENT NO. : 4,726,832           Page 1 of 2
DATED : February 23, 1988
INVENTOR(S) : MASUHIDE KAJII, ET AL.

It is certified that error appears in the above-identified patent and that said Letters Patent is hereby corrected as shown below:

AT [57] IN THE ABSTRACT

Line 9, "multi article" should read --multi-article--.

COLUMN 1

Line 56, "multi article" should read --multi-article--.

COLUMN 2

Line 8, "multi article" should read --multi-article--.
Line 13, "multi" should read --multi- --.
Line 42, "multi article" should read --multi-article--.

COLUMN 4

Line 58, "The" should read --the--.

COLUMN 6

Line 26, "every" should read --all--.
Line 40, "colling." should read --cooling.--.

COLUMN 7

Line 8, "shift" should read --shifts--.
Line 28, "reache" shoud read --reach--.
Line 46, "unpreferable" should read --not preferable--.

UNITED STATES PATENT AND TRADEMARK OFFICE
CERTIFICATE OF CORRECTION

PATENT NO. : 4,726,832

DATED : February 23, 1988

INVENTOR(S) : MASUHIDE KAJII, ET AL.

It is certified that error appears in the above-identified patent and that said Letters Patent is hereby corrected as shown below:

COLUMN 8

Line 11, "inter-farnes" should read --inter-furnace--.
Line 24, "'A2'" should read --"A2"--.

COLUMN 10

Line 1, "multi particle" should read --multi-article--.

Signed and Sealed this

Second Day of August, 1988

*Attest:*

DONALD J. QUIGG

*Attesting Officer*  *Commissioner of Patents and Trademarks*